United States Patent Office
3,245,894
Patented Apr. 12, 1966

3,245,894
PRODUCTION OF POLYBUTADIENE
Robert A. Hinton, Bartlesville, Okla., assignor to Phillips Petroleum Company, a corporation of Delaware
No Drawing. Filed July 15, 1963, Ser. No. 295,609
2 Claims. (Cl. 204—162)

This invention relates to the production of polybutadiene. In another aspect, it relates to a method of improving the color of a high-cis polybutadiene product produced by polymerization of 1,3-butadiene with a catalyst comprising that obtained upon commingling an organometal compound, a titanium chloride or bromide, and elemental iodine.

Widespread attention and commercial interest has been attracted to polybutadiene in recent years in the field of rubbery polymers. For example, polybutadiene containing a high percent, i.e. at least 80 percent, of cis-1,4- addition, has physical properties of such a nature that the polymer is suitable for a variety of uses for which conventional synthetic rubbers have heretofore been comparatively unsatisfactory. In particular, polybutadiene with 85 percent or higher cis-1,4 configuration is particularly suitable for the fabrication of heavy duty tires.

Production of such high-cis polybutadiene is often carried out by solution polymerization of 1,3-butadiene with a catalyst comprising that obtained upon commingling an organometal compound, such as triisobutylaluminum, a titanium halide, such as titanium tetrachloride, and elemental iodine. The polybutadiene product recovered often has a dark color (usually a dark orange to brown), particularly where rosin acid is used to shortstop the reaction effluent. Such colored product is often undesirable because some fabricators would prefer a lighter color or substantially colorless product.

Accordingly, an object of this invention is to produce an improved polybutadiene product. Another object is to provide a method for improving the color of a high-cis polybutadiene product produced by solution polymerization of 1,3-butadiene with a catalyst obtained by commingling an organometal compound, titanium chloride or titanium bromide, and elemental iodine. Other objects and advantages of this invention will become apparent to those skilled in the art from the following description and appended claims.

Briefly, the subject invention provides a method whereby an improved polybutadiene product is produced by irradiating a solution of the polymer with radiation having wavelengths in the range of 100 to 5000 angstroms, preferably ultraviolet radiation. In a preferred embodiment, the polymerization reaction effluent, produced by solution polymerization of 1,3-butadiene with a catalyst comprising that obtained upon commingling an organometal compound, such as triisobutylaluminum, titanium tetrachloride, and elemental iodine, is short-stopped with rosin acid and irradiated with ultraviolet radiation, after which the light colored or substantially colorless high-cis polybutadiene product is recovered from the irradiated effluent.

The radiation used in this invention to improve the color of the polybutadiene product can be supplied from lamps or other apparatus which are available for generation of such radiation. Sources of ultraviolet radiation include mercury vapor lamps, fluorescent lamps, and the like. The radiation source can be disposed within the reaction effluent line or by any other suitable means which will allow the reaction effluent to be subjected to the emitted radiation. The ultraviolet radiation can have wave lengths in the range of 100 to 3800 angstroms, with wave lengths below 2900 angstroms being preferred. Radiation in the range of 100 to 5000 angstroms will have a potential or energy level in the range of 2.48 to 124 electron volts. The radiation dosage rate and the total radiation dosage can vary widely and will be dependent upon such factors as the amount of polymer to be irradiated, the particular radiation equipment or source used, and the intensity of the source. In functional terms, the radiation dosage rate and total radiation dosage will be sufficient to improve the color of the polymer product. Generally, the irradiation period will last from 1 minute to 10 hours, although periods outside this range can be used. Low radiation rates can be used but are not practical from a time standpoint since the desired improvement in color will be correspondingly slow. High rates, although useable, may be difficult to obtain with available radiation equipment and are not necessary in the practice of this invention.

The temperature at which the irradiation of the polymer solution is carried out can vary, since the desired effect of the radiation of the polymer solution is not dependent on temperature. Usually, the temperature of the polymer solution will be in the range from −100 to 250° F.

As mentioned above, the irradiation of the polymer solution is preferably carried out after the same has been treated with rosin acid to shortstop or inactivate the catalyst. Rosin acid is a disproportionated abietic acid and is commercially available and has been used for many years as a shortstopping agent. The rosin acid is non-volatile and remains in the polymer. The rosin acid is usually used in an excess of that required to render the catalyst in the effluent completely inactive, and this amount will depend upon the particular catalyst employed. For example, with triisobutylaluminum as the organometal component of the catalyst, about 1 to 2 parts of rosin acid will inactivate 1 part by weight of triisobutylaluminum. Since normally less than 1 part triisobutylaluminum or similar compound per 100 parts by weight of polymer will be present in the effluent, rosin acid can be added to provide a specification content of 1 to 2 phr. rosin acid in the finished product.

It is also conventional to treat the reaction effluent with an anti-oxidant, and this is preferably done in this invention prior to irradiation of the reaction effluent. Any number of well-known rubber anti-oxidants can be used, for example, N-isopropyl-N'-phenyl-p-phenylenediamine, N-phenyl-N'-cyclohexyl-p-phenylenediamine, 2,2-methylene bis(4-methyl-6-tert-butyl phenol), and the like.

Following irradiation of the reaction effluent or polymer solution, the effluent having for example 5–7 weight percent dissolved rubber solids, can be passed to suitable conventional means for recovery of the polybutadiene product. For example, the irradiated reaction effluent can be passed to a flash preheater and then to a flash tank where the pressure is reduced to atmospheric pressure or slightly above. The flashed vapors, comprising a stream of unreacted butadiene and some diluent, is withdrawn overhead from the flash tank and this stream can be recycled to the polymerization reaction. The remaining reaction effluent or rubber solution having, for example, 15 weight percent rubber solids, can then be cooled, for example to 150° F., and stripped with steam in one or more strippers to produce a rubber slurry. The rubber slurry can be dewatered and dried, and the resulting polybutadiene baled as product. As mentioned above, the polybutadiene product resulting from this invention will have a light color or be substantially colorless. It can be compounded by any of the known methods such as have been used in the past for compounding natural rubber. Vulcanization agents, vulcanization accelerators, accelerator activators reinforcing agents, anti-oxidants, and fillers can be employed in compounding the improved polybutadiene product of this invention.

The polymerization reaction effluent or polymer solution which is irradiated according to this invention can be that obtained upon the solution polymerization of 1,3-butadiene in the presence of a diluent or solvent which is substantially inert and non-detrimental to the polymerization reaction and in which the polymer formed is soluble. Suitable diluents which can be used for this purpose include aromatics, such as benzene, toluene, xylene, ethylbenzene, and mixtures thereof, straight and branched chain paraffins having up to and including 12 carbon atoms per molecule, such as propane, normal butane, isobutane, isohexane, isooctane, normal decane, and the like, including mixtures thereof, and cycloparaffins, such as methylcyclohexane and ethylcyclohexane. Aromatic hydrocarbons are preferred diluents since the polybutadiene product will have a higher cis content when such diluents are used. The concentration of the butadiene monomer in the diluent can vary, but generally will be about 5 to 15 weight percent.

The polymerization can be carried out at temperatures varying over a wide range, e.g. —100 to 250° F., preferably in the range of —30 to 160° F. The polymerization reaction can be carried out under autogenous pressure or at any other pressure sufficient to retain the reaction mixture substantially in the liquid phase.

The catalysts which can be employed in polymerizing 1,3-butadiene to produce a high-cis polybutadiene product are known in the art and those used in this invention comprise those obtained upon commingling (1) an organometal compound such as $R_2AlX$, $R_2Mg$, $R_3Al$ and $R_nMH_m$, where R is a hydrogen radical selected from the group consisting of alkyl, aryl, and cycloalkyl, and combinations thereof, such as alkaryl, aralkyl, alkylcycloalkyl, arylcycloalkyl, cycloalkylalkyl, and the like, with up to and including 20 carbon atoms in each of the R groups, M is a metal selected from the group consisting of aluminum, gallium, indium, and thallium, and $n$ and $m$ are integers each of which is in the range of 1 to 2 with the sum of $n+m$ equal to 3, (2) a titanium compound such as $Ti(OR)_4$, where R is as defined above, or $TiX_m$, where X is chlorine or bromine and $m$ is an integer from 2 to 4, inclusive, and (3) iodine. The mole ratios of the various catalyst components can vary. For example in the case where the catalyst comprises the admixture of $R_2AlX$, $Ti(OR)_4$ and iodine, the mole ratio of the aluminum compound to titanium compound can range from 4:1 to 15:1, and the mole ratio of titanium compound to iodine can range from 0.2:1 to 4:1. In the case of the catalyst comprising in admixture $R_2Mg$, $TiX_m$ and iodine, the mole ratio of the organomagnesium compound to the total titanium can range from 0.75:1 to 3:1, and the mole ratio of the titanium halide to iodine can range from 0.5:1 to 1.25:1. In the case of the catalyst comprising in admixture $R_3Al$, $TiX_m$ and iodine, the mole ratio of the organoaluminum compound to the titanium compound can range from 2:1 to 20:1, and the mole ratio of the titanium compound to the iodine can range from 10:1 to 0.25:1. In the case of the catalyst comprising in admixture $R_nMH_m$, $TiX_n$, and iodine, the mole ratio of the organometal hydride to the titanium halide can range from 2:1 to 20:1, and the mole ratio of the titanium halide to iodine can range from 0.25:1 to 10:1. In all of these catalyst systems the catalyst level can vary over a wide range, and usually will be in the range from 1 to 20 gram millimoles of the organometal compound per 100 grams of 1,3-butadiene polymerized. The actual catalyst level used will, in general, be determined by the molecular weight of the product desired.

Representative catalyst systems which can be used include diethyl aluminum chloride, tetra-n-butyltitanate, and iodine; diphenylmagnesium, titanium tetrachloride and iodine; dimethylmagnesium, titanium tetrachloride and iodine; diphenylmagnesium, titanium tetrabromide and iodine; di-1-naphthylmagnesium, titanium tetrachloride and iodine; triethylaluminum, titanium tetrachloride, and iodine; triisobutylaluminum, titanium trichloride, and iodine; tri-n-pentylaluminum, titanium tetrabromide, and iodine; triisooctylaluminum, titanium dichloride, and iodine; tri-n-dodecylaluminum, titanium tetrachloride, and iodine; triphenylaluminum, titanium tetrachloride and iodine; tri-alpha-naphthylaluminum, titanium tetrabromide, and iodine; diphenyl-alpha-naphthylaluminum, titanium tetrachloride and iodine; tribenzylaluminum, titanium tetrabromide and iodine; phenylaluminum dihydride, titanium dichloride and iodine; dicyclohexylaluminum hydride, titanium tribromide and iodine; di(2-naphthyl)aluminum hydride, titanium dibromide and iodine; phenylindium dihydride, titanium tetrachloride and iodine; 3-ethylphenylindium dihydride, titanium tetrabromide, and iodine; di(2-cyclohexylethyl)indium hydride, titanium trichloride and iodine; eicosylindium dihydride, titanium tribromide and iodine; dipentadecylgallium hydride, titanium dichloride and iodine; di(2-cyclohexylethyl)gallium hydride, titanium tribromide and iodine; dibenzylgallium hydride, titanium tetrabromide and iodine; diphenylthallium hydride, titanium dibromide and iodine; dicyclohexylthallium, titanium tetrabromide and iodine; and the like.

The polymerization reaction can be carried out as a batch process by charging the 1,3-butadiene into the reactor containing the catalyst and diluent, or can be carried out continuously in one or a series of reactors (whose operating temperatures can progressively increase). Since the polymerization reaction is well known in the art, further details thereof will not be described in the interest of brevity.

The percent of cis microstructure, referred to herein, is determined by dissolving a sample of the polybutadiene in carbon disulfide so as to form a solution having 25 grams of polymer per liter of solution. The infrared spectrum of the solution (percent transmission) is then determined in a commercial infrared spectrophotometer. The percent of the total unsaturation present as trans 1,4- is calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction is determined at the 10.35 micron band and the extinction coefficient is 146, 129.8, or 132.6 (liters-mols$^{-1}$-centimeters$^{-1}$) depending on the spectrophotometer and/or cell used. The percent of the total unsaturation present as 1,2- (or vinyl) is calculated according to the above equation, using the 11.0 micron band and the extinction coefficient is 209 or 182.1 (liters-mols$^{-1}$-centimeters$^{-1}$) depending on the spectrophotometer and/or cell used. The percent of the total unsaturation present as cis 1,4- is obtained by subtracting the trans 1,4- and 1,2- (vinyl) determined according to the above procedure from the theoretical unsaturation, assuming one double bond per each $C_4$ unit in the polymer.

The objects and advantages of this invention are illustrated in the following example, but it should be understood that the particular catalyst used, reaction conditions, radiation conditions, and other details in this example should not limit unduly this invention.

1,3-butadiene was continuously polymerized in a pilot plant using a reactor train which comprised 4 reactors in series, each having a capacity of 10 gal. and a residence of 30 min. The butadiene was mixed with the toluene and the mixture heated to 40° F. and charged to a premixer (having a capacity of 290 cc.) together with triisobutylaluminum and iodine. Titanium tetrachloride also added to the premixer. From the premixer, the reaction feed mixture was passed to the reactor train. The weight recipe employed was 900 parts toluene/100 parts 1,3-butadiene/0.325 part triisobutylaluminum/0.208 part iodine/0.039 part titanium tetrachloride. The operation temperature of the first reactor was 120° F. and a conversion of 72% of the butadiene was obtained therein, the operation temperature of the second reactor was 152° F. and the conversion increased to 88%, the operation temperature of the third reactor was 172° F. and the conversion increased to 95%, and the last reactor was operated at a temperature of 148° F. to obtain a final conversion of 98%. The reaction effluent from the last reactor was shortstopped with 2.0 phr. of rosin acid (Resin 731–D) and was treated with 0.50 phr. 2,2-methylene bis(4-methyl-6-tert-butyl phenol) anti-oxidant (Cyanox SS).

Two 1-quart bottles were filled with the shortstopped and anti-oxidant-treated reaction effluent. One bottle was kept in the dark as a control and the other bottle was placed on a white reflector and exposed at room temperature to the ultraviolet light from a fluorescent lamp for 2 hours. After such exposure, the polymer solutions from each bottle were stripped with steam to remove solvent and the stripped rubber solution was dried on a drum drier to remove water and residual solvent. Samples of each of the high-cis polybutadiene products were pressed into slabs and visually examined for color. The slab obtained from the polymer solution irradiated according to this invention was a much lighter yellow or amber than that slab from the control polymer solution, thus establishing the color-improving effect of irradiating the polymer solution with ultraviolet light according to the practice of this invention.

Various modifications and alterations of this invention will become apparent to those skilled in the art without departing from the scope and spirit of this invention, and it should be understood that this invention is not to be limited unduly to that set forth herein for illustrative purposes.

I claim:

1. In a method for producing a high-cis polybutadiene product, wherein 1,3-butadiene is solution polymerized with a polymerization catalyst consisting essentially of that obtained upon commingling (1) an organometal compound, (2) a titanium compound, and (3) elemental iodine, the resulting polymerization effluent is treated with a shortstopping agent, and the resulting polybutadiene product is recovered from said reaction effluent, the improvement comprising irradiating said shortstopped reaction effluent before the recovery of the resulting polybutadiene from the reaction effluent with ultraviolet radiation having wave lengths of from 100 to 3800 angstroms to form a more colorless product.

2. In a method for producing a high-cis polybutadiene product, wherein 1,3-butadiene is solution polymerized with a polymerization catalyst consisting essentially of that obtained upon commingling (1) an organometal compound having one of the general formulas $R_2AlX$, $R_2Mg$, $R_3Al$ and $R_nMH_m$, where R is a hydrocarbon radical selected from the group consisting of alkyl, aryl, cycloalkyl radicals, and combinations of such radicals, M is a metal selected from the group consisting of aluminum, gallium, indium, and thallium, $n$ and $m$ are integers each of which is in the range of 1 to 2 with the sum of $n+m$ equal to 3, (2) a titanium compound having one of the general formulas $Ti(OR)_4$ and $TiX_m$, where R is defined above, X is selected from the group consisting of chlorine and fluorine, and $m$ is an integer in the range of 2 to 4, and (3) elemental iodine, the resulting polymerization effluent is treated with a shortstopping agent, and the resulting polybutadiene product is recovered from said reaction effluent, the improvement comprising irradiating said shortstopped reaction effluent before the recovery of the resulting polybutadiene from the reaction effluent with ultraviolet radiation having wave lengths of from 100 to 3800 angstroms to form a more colorless product.

References Cited by the Examiner
UNITED STATES PATENTS

| | | | |
|---|---|---|---|
| 2,878,175 | 3/1959 | Golub | 204—162 |
| 2,878,176 | 3/1959 | Golub | 204—162 |
| 2,943,987 | 7/1960 | Anderson | 204—162 |
| 3,099,648 | 7/1963 | Dye | 260—94.3 |

MURRAY TILLMAN, *Primary Examiner.*